(12) United States Patent
Khanapure et al.

(10) Patent No.: US 9,488,132 B2
(45) Date of Patent: Nov. 8, 2016

(54) SYSTEMS FOR THERMAL MANAGEMENT OF ENGINE VALVES

(71) Applicant: General Electric Company, Schenectady, NY (US)

(72) Inventors: Sudheer Kadappa Khanapure, Bangalore (IN); Chandrakesavan Balasubramanian, Bangalore (IN); Alexis Parker Gruschow, Millcreek, PA (US)

(73) Assignee: General Electric Company, Schenectady, NY (US)

( * ) Notice: Subject to any disclaimer, the term of this patent is extended or adjusted under 35 U.S.C. 154(b) by 97 days.

(21) Appl. No.: 14/445,305

(22) Filed: Jul. 29, 2014

(65) Prior Publication Data
US 2016/0032868 A1    Feb. 4, 2016

(51) Int. Cl.
| | |
|---|---|
| *F02B 75/00* | (2006.01) |
| *F02M 21/02* | (2006.01) |
| *F02M 35/10* | (2006.01) |
| *F02M 53/04* | (2006.01) |
| *F02M 53/08* | (2006.01) |
| *F02M 31/20* | (2006.01) |
| *F01N 13/10* | (2010.01) |

(52) U.S. Cl.
CPC ....... *F02M 21/023* (2013.01); *F02M 21/0245* (2013.01); *F02M 21/0248* (2013.01); *F02M 21/0281* (2013.01); *F02M 31/20* (2013.01); *F02M 35/1015* (2013.01); *F02M 35/10288* (2013.01); *F02M 53/043* (2013.01); *F02M 53/08* (2013.01); *F01N 13/10* (2013.01); *Y02T 10/32* (2013.01)

(58) Field of Classification Search
CPC .......... F02F 1/38; F02F 1/40; F02M 21/023; F02M 21/0245; F02M 21/0281; F02M 35/1015; F02M 35/10288; F01N 13/10
USPC ..................................... 123/41.82 R, 184.21
See application file for complete search history.

(56) References Cited

U.S. PATENT DOCUMENTS

| | | | | |
|---|---|---|---|---|
| 2,231,172 | A * | 2/1941 | Starr | 123/261 |
| 2,243,817 | A * | 5/1941 | Herrmann | 123/41.31 |
| 2,941,521 | A * | 6/1960 | Shrimpton et al. | 123/41.82 R |
| 4,542,719 | A * | 9/1985 | Wilkinson | 123/41.35 |
| 4,635,591 | A * | 1/1987 | Hledin | 123/37 |
| 5,551,382 | A * | 9/1996 | Bauer et al. | 123/41.82 R |
| 6,953,029 | B2 | 10/2005 | Uitenbroek | |
| 8,584,628 | B2 * | 11/2013 | Brewer et al. | 123/41.82 R |
| 8,814,171 | B2 * | 8/2014 | Beyer | 277/592 |

* cited by examiner

*Primary Examiner* — Marguerite McMahon
(74) *Attorney, Agent, or Firm* — GE Global Patent Operation

(57) ABSTRACT

Various methods and systems are provided for cooling gas admission valves configured to admit gaseous fuel to an engine. In one embodiment, a system comprises an intake manifold including a gaseous fuel line for supplying gaseous fuel to a plurality of cylinders of an engine configured to combust the gaseous fuel, and at least one gas admission valve mounted to the gaseous fuel passage for regulating admission of the gaseous fuel to the plurality of cylinders. The system further includes a thermal management system configured to direct thermal fluid to the plurality of gas admission valves.

19 Claims, 8 Drawing Sheets

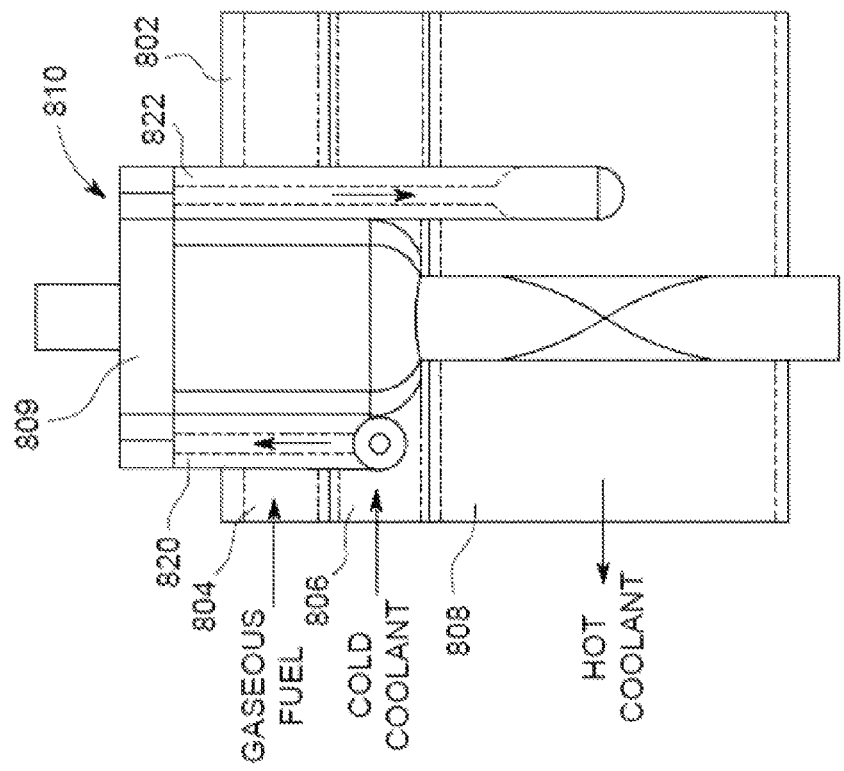
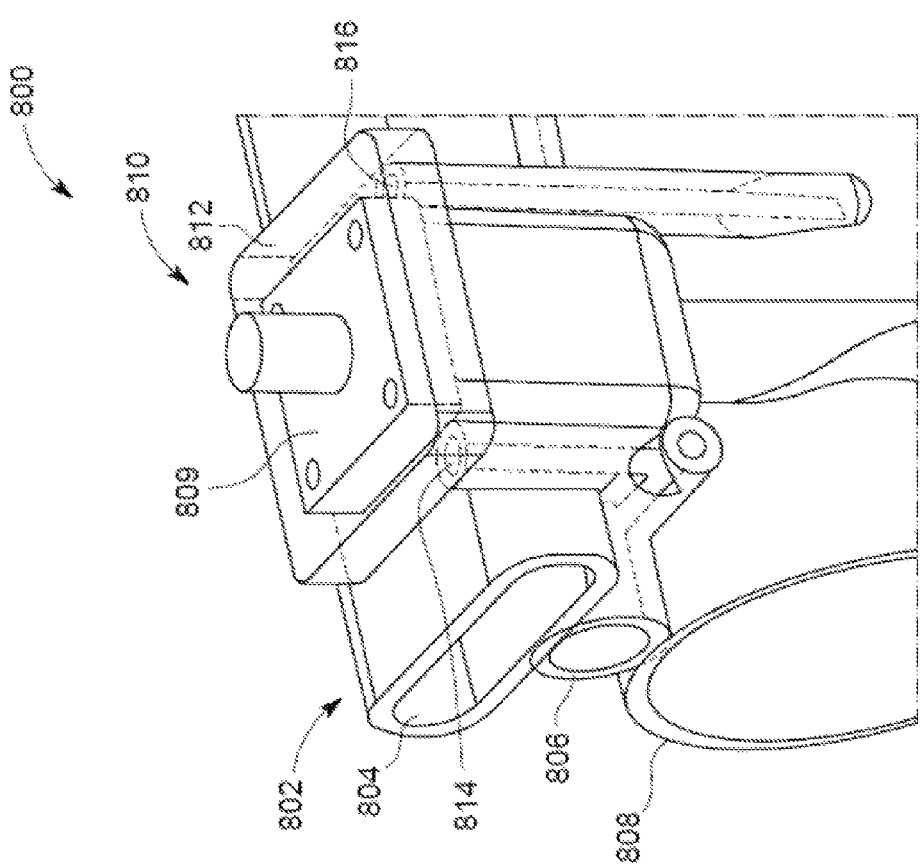
FIG. 8B
FIG. 8A

SYSTEMS FOR THERMAL MANAGEMENT OF ENGINE VALVES

BACKGROUND

1. Technical Field

Embodiments of the subject matter disclosed herein relate to an engine, engine components, and an engine system, for example.

2. Discussion of Art

Vehicles may include a prime mover that is powered by a fuel source to generate mechanical energy. In some examples, the prime mover may be a combustion engine that is fueled by diesel, gasoline, or other liquid petroleum distillates. In other examples the engine may additionally or alternatively utilize a gaseous fuel, such as natural gas. Gaseous fuel may be admitted to the engine via one or more gas admission valves, which may have temperature limitations for maintaining reliable performance.

BRIEF DESCRIPTION

In one embodiment, a system comprises an intake manifold including a gaseous fuel line for supplying gaseous fuel to a plurality of cylinders of an engine configured to combust the gaseous fuel, and one or more gas admission valves mounted to the gaseous fuel passage for regulating admission of the gaseous fuel to the plurality of cylinders. The system also includes a thermal management system configured to direct thermal fluid to the one or more gas admission valves.

BRIEF DESCRIPTION OF THE DRAWINGS

FIGS. 8A and 8B show schematic diagrams of a thermal management system according to a fifth embodiment of the invention.

DETAILED DESCRIPTION

Embodiments of the subject matter disclosed herein relate to a system for an engine configured to combust gaseous fuel. In one example, the engine may be installed in a vehicle, such a rail vehicle. In other examples, the engine may be installed in a marine vessel, truck, or other self-propelled vehicle, or the engine may be installed in a semi-mobile or stationary platform. The engine comprises an intake manifold including a gaseous fuel passage for supplying the gaseous fuel to a plurality of cylinders of the engine. The gaseous fuel may include natural gas, hydrogen, or another gaseous fuel. Further, the engine may be configured to additionally or alternatively combust liquid fuel, such as diesel. The engine includes one or more gas admission valves (e.g., a plurality of gas admission valves) mounted to the gaseous fuel passage for regulating admission of the gaseous fuel to the plurality of cylinders. To cool the gas admission valves, a thermal management system is included to direct thermal fluid to the plurality of gas admission valves. The thermal fluid may comprise air or liquid thermal fluid. As used herein, thermal management may refer to the introduction of a thermal fluid to the gas admission valves, where the thermal fluid is purposely sourced and introduced to the gas admission valves for valve cooling (and not simply present as a byproduct of vehicle operation, for example). In further examples, thermal management may also refer to supplying thermal fluid that is compressed or otherwise pressurized.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a self-propelled rail vehicle, and more broadly, as an example of a mobile platform, supporting a system incorporating an embodiment of the invention.

Figure 1:
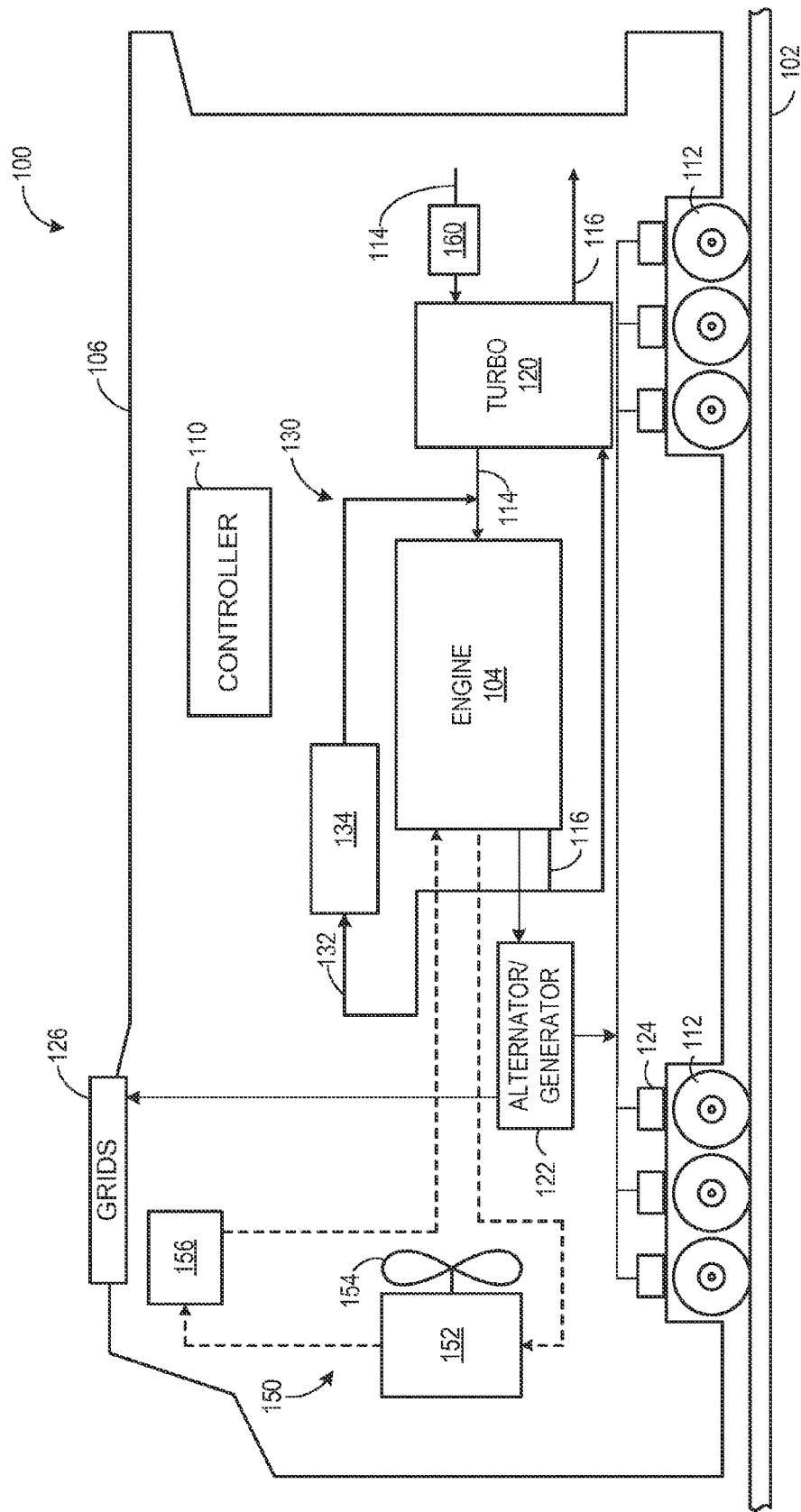
FIG. 1 shows a schematic diagram of an embodiment of a vehicle with an engine.

Before further discussion of the approach for cooling gaseous fuel admission valves, an example of a platform is disclosed in which an engine may be configured for a vehicle, such as a rail vehicle. For example, FIG. 1 shows a block diagram of an embodiment of a vehicle system 100, herein depicted as a rail vehicle or other vehicle 106 (e.g., locomotive), configured to run on a rail 102 via a plurality of wheels 112. As depicted, the rail vehicle includes an engine 104. In other non-limiting embodiments, the engine may be a stationary engine, such as in a power-plant application, or an engine in a marine vessel or other off-highway vehicle propulsion system as noted above.

The engine receives intake air for combustion from an intake passage 114. The intake passage receives ambient air from an air filter 160 that filters air from outside of the vehicle. Exhaust gas resulting from combustion in the engine is supplied to an exhaust passage 116. Exhaust gas flows through the exhaust passage, and out of an exhaust stack of the vehicle. In one example, the engine is a diesel engine that combusts air and diesel fuel through compression ignition. In other non-limiting embodiments, the engine may alternatively or additionally combust fuel including gasoline, kerosene, natural gas, biodiesel, or other petroleum distillates of similar density through compression ignition (and/or spark ignition).

In one embodiment, the vehicle is a diesel-electric vehicle. As depicted in FIG. 1, the engine is coupled to an electric power generation system, which includes an alternator/generator 122 and electric traction motors 124. For example, the engine is a diesel and/or natural gas engine that generates a torque output that is transmitted to the generator which is mechanically coupled to the engine. In one embodiment herein, engine is a multi-fuel engine operating with diesel fuel and natural gas, but in other examples engine may use various combinations of fuels other than diesel and natural gas.

The generator produces electrical power that may be stored and applied for subsequent propagation to a variety of downstream electrical components. As an example, the generator may be electrically coupled to a plurality of traction motors and the generator may provide electrical power to the plurality of traction motors. As depicted, the plurality of traction motors are each connected to one of the plurality of wheels to provide tractive power to propel the vehicle. One example configuration includes one traction motor per wheel set. As depicted herein, six pairs of traction motors correspond to each of six pairs of motive wheels of the rail vehicle. In another example, alternator/generator may be coupled to one or more resistive grids 126. The resistive grids may be configured to dissipate excess engine torque via heat produced by the grids from electricity generated by the alternator/generator.

In some embodiments, the vehicle system may include a turbocharger 120 that is arranged between the intake passage and the exhaust passage. The turbocharger increases air charge of ambient air drawn into the intake passage in order to provide greater charge density during combustion to increase power output and/or engine-operating efficiency. The turbocharger may include a compressor (not shown) which is at least partially driven by a turbine (not shown). While in this case a single turbocharger is included, the system may include multiple turbine and/or compressor stages. Further, in some examples, the vehicle system may additionally or alternatively include a supercharger, where a compressor is driven by a motor, for example.

In some embodiments, the vehicle system may further include an aftertreatment system (illustrated in FIG. 2 as aftertreatment device 214) coupled in the exhaust passage upstream and/or downstream of the turbocharger. In one embodiment, the aftertreatment system may include a diesel oxidation catalyst (DOC) and a diesel particulate filter (DPF). In other embodiments, the aftertreatment system may additionally or alternatively include one or more emission control devices. Such emission control devices may include a selective catalytic reduction (SCR) catalyst, three-way catalyst, NOx trap, or various other devices or systems. In some examples, an aftertreatment system may not be included in the vehicle system, and engine emissions may be controlled in an alternative manner, such as via exhaust gas recirculation, described below.

The vehicle system may further include an exhaust gas recirculation (EGR) system 130 coupled to the engine, which routes exhaust gas from the exhaust passage of the engine to the intake passage downstream of the turbocharger. In some embodiments, the exhaust gas recirculation system may be coupled exclusively to a group of one or more donor cylinders of the engine (also referred to a donor cylinder system). As depicted in FIG. 1, the EGR system includes an EGR passage 132 and an EGR cooler 134 to reduce the temperature of the exhaust gas before it enters the intake passage. By introducing exhaust gas to the engine, the amount of available oxygen for combustion is decreased, thereby reducing the combustion flame temperatures and reducing the formation of nitrogen oxides (e.g., NOx).

In some embodiments, the EGR system may further include an EGR valve for controlling an amount of exhaust gas that is recirculated from the exhaust passage of the engine to the intake passage of the engine. The EGR valve may be an on/off valve controlled by a controller, or it may control a variable amount of EGR, for example. As shown in the non-limiting example embodiment of FIG. 1, the EGR system is a high-pressure EGR system. In other embodiments, the vehicle system may additionally or alternatively include a low-pressure EGR system, routing EGR from downstream of the turbine to upstream of the compressor.

As depicted in FIG. 1, the vehicle system further includes a cooling system 150. The cooling system circulates coolant through the engine to absorb waste engine heat and distribute the heated coolant to a heat exchanger, such as a radiator 152. A fan 154 may be coupled to the radiator in order to maintain an airflow through the radiator when the vehicle is moving slowly or stopped while the engine is running. In some examples, fan speed may be controlled by a controller. Coolant which is cooled by the radiator enters a tank 156. The coolant may then be pumped by a water, or coolant, pump (not shown) back to the engine or to another component of the vehicle system, such as the EGR cooler.

The vehicle further includes an engine controller 110 (referred to hereafter as the controller) to control various components related to the vehicle. As an example, various components of the vehicle system may be coupled to the controller via a communication channel or data bus. In one example, the controller includes a computer control system. The controller may additionally or alternatively include a memory holding non-transitory computer readable storage media (not shown) including code for enabling on-board monitoring and control of rail vehicle operation.

The controller may receive information from a plurality of sensors and may send control signals to a plurality of actuators. The controller, while overseeing control and management of the vehicle, may be configured to receive signals from a variety of engine sensors, as further elaborated herein, in order to determine operating parameters and operating conditions, and correspondingly adjust various engine actuators to control operation of the vehicle. For example, the engine controller may receive signals from various engine sensors including, but not limited to, engine speed, engine load, intake manifold air pressure, boost pressure, exhaust pressure, ambient pressure, ambient temperature, exhaust temperature, engine coolant pressure, gas temperature in the EGR cooler, or the like. Correspondingly, the controller may control the vehicle by sending commands to various components such as the traction motors, the alternator/generator, cylinder valves, fuel injectors, a notch throttle, or the like. Other actuators may be coupled to various locations in the rail vehicle.

Each cylinder of the engine may be configured with one or more fuel injectors for providing fuel thereto. As a non-limiting example, a fuel injector may be directly coupled to the cylinder for injecting fuel directly therein. In this manner, the fuel injector provides what is known as direct injection of a fuel into the combustion cylinder. The fuel may be delivered to the fuel injector from a high-pressure fuel system including a fuel tank, fuel pumps, and a fuel rail (not shown). In one example, the fuel is diesel fuel that is combusted in the engine through compression ignition. In other non-limiting embodiments, the fuel may be gasoline, kerosene, biodiesel, or other petroleum distillates of similar density through compression ignition (and/or spark ignition). Further, as explained in more detail below, each cylinder of the engine may be configured to receive gaseous fuel (e.g., natural gas) alternative to or in addition to diesel fuel. The gaseous fuel may be provided to the cylinder via the intake manifold, as explained below.

Figure 2:
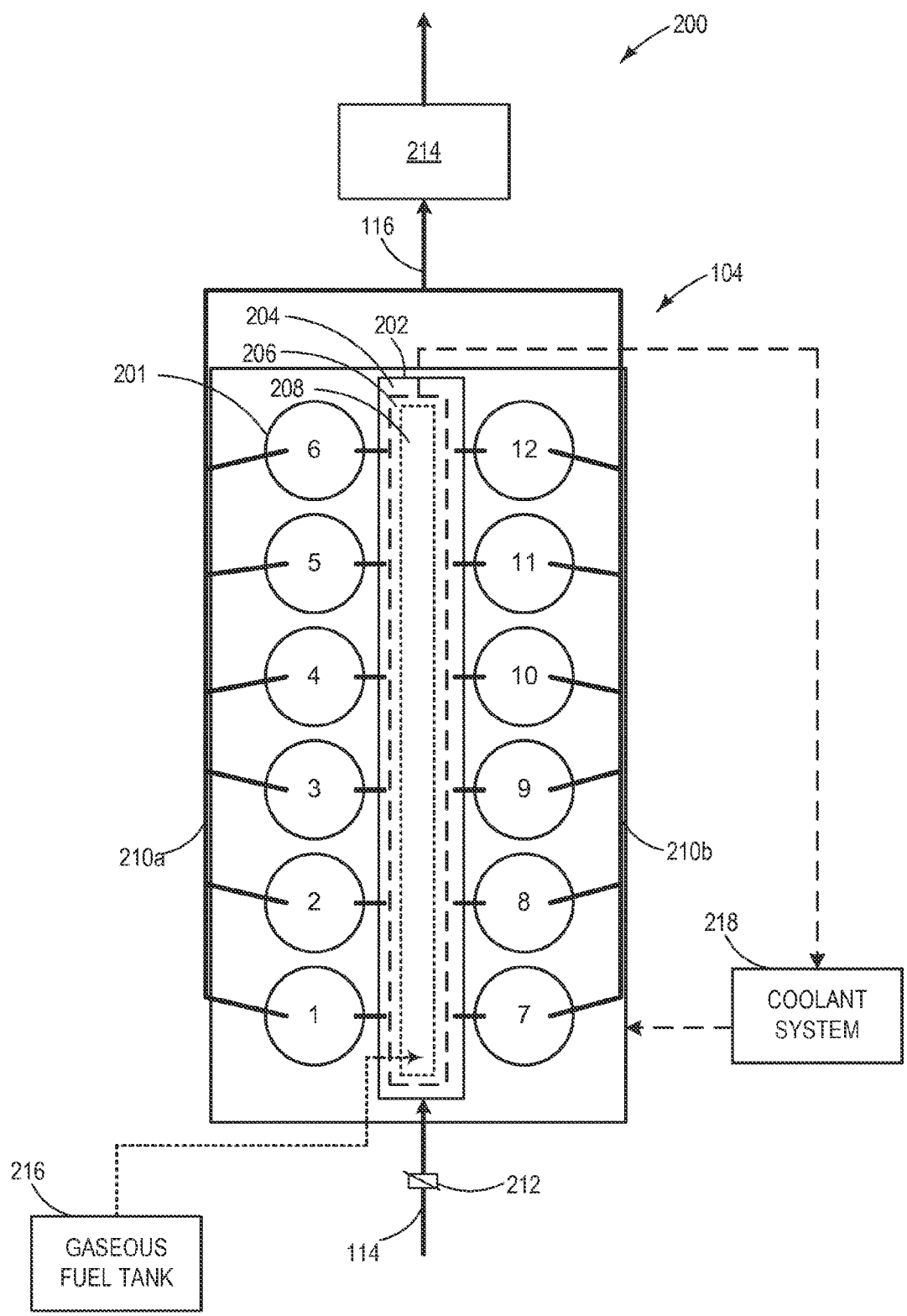
FIGS. 2-3 show schematic diagrams of an engine system including the engine of FIG. 1.

FIG. 2 shows a schematic diagram of an engine system 200 including multi-cylinder engine 104 having a plurality of cylinders 201. Thus, the engine system includes the engine 104 described above with respect to FIG. 1. The engine receives intake air for combustion from an intake manifold 202. The intake manifold receives intake air from the intake passage 114, which receives ambient air from an air filter (shown in FIG. 1) that filters air from outside of a vehicle in which the engine 104 may be positioned. The flow of intake air into intake manifold may be controlled by a throttle 212, the position of which may be controlled by the controller (e.g., controller 110 of FIG. 1).

In the embodiment depicted in FIG. 2, the engine is a V-12 engine having twelve cylinders. In other examples, the engine may be a V-6, V-8, V-10, V-16, I-4, I-6, I-8, opposed 4, or another engine type. Due to the vee configuration of the engine, the engine includes a first cylinder bank having six cylinders (e.g., cylinders 1-6) and a second cylinder bank having six cylinders (e.g., cylinders 7-12). The intake manifold is arranged between the two cylinder banks and is configured to supply intake air to each cylinder of each bank via a plurality of intake runners. While not shown in FIG. 2, each intake runner is coupled to a separate cylinder head that at least partially defines a cylinder. Thus, intake air that flows through the intake manifold is distributed to a plurality of intake runners, each fluidically coupled to a separate cylinder head of the engine.

The intake manifold is configured to supply intake air to the cylinders of the engine, as described above. However, the intake manifold includes further passageways for draining thermal fluid (e.g., engine coolant and/or lubricating oil) from the engine and delivering gaseous fuel to the engine. As such, the intake manifold includes a first passage 204 configured to flow intake air. The first passage is coupled to a plurality of intake runners. The first passage receives intake air from the intake passage.

To drain coolant from the engine, the intake manifold includes a second passage 206. The second passage receives coolant that is directed out of each cylinder head, for example, and the second passage directs the coolant back to the general engine coolant system 218. The engine coolant system may include one or more coolant components, such as a radiator (e.g., radiator 152 of FIG. 1), coolant tank (e.g., tank 156), cooling lines, pumps and/or other components. Thus, coolant from the engine coolant system is pumped to the engine, where it flows through one or more jackets of the cylinder block and/or cylinder head to cool the engine. The coolant then drains out of the engine via drainage lines leading out from each cylinder head to the second passage, and the coolant is returned to the engine coolant system.

In some modes of operation, the engine may operate with both liquid fuel combustion (e.g., diesel fuel) and gaseous fuel (e.g., natural gas) combustion. While diesel fuel is delivered to each cylinder according to the configuration described above, gaseous fuel may be delivered to each cylinder via a third passage 208 of the intake manifold. As shown in FIG. 2, the third passage of the intake manifold may receive a supply of gaseous fuel from a gaseous fuel tank 216, via one or more gaseous fuel lines, pumps, pressure regulators, etc. In some embodiments, the gaseous fuel tank may be located remotely from the engine, such as on a different rail car (e.g., on a fuel tender car), and the gaseous fuel may be supplied to the engine via one or more fuel lines that traverse the separate cars. However, in other embodiments the gaseous fuel tank may be located on the same rail car as the engine. The third passage may include a plurality of gas admission valves (illustrated in FIG. 3 and described in more detail below), each configured to supply gaseous fuel from the third passage to a respective cylinder head.

Exhaust gas resulting from combustion in the engine is supplied to the exhaust passage 116, where the exhaust may be treated by aftertreatment device 214 and/or may flow through one or more turbochargers or superchargers before exiting to atmosphere. In the configuration illustrated in FIG. 2, each cylinder bank has an exhaust manifold. For example, exhaust manifolds 210a and 210b are illustrated in FIG. 2. Each exhaust manifold receives exhaust released from each cylinder of a respective cylinder bank (via an exhaust runner of the respective cylinder head, for example). Each exhaust manifold directs exhaust to the common exhaust passage.

Figure 3:
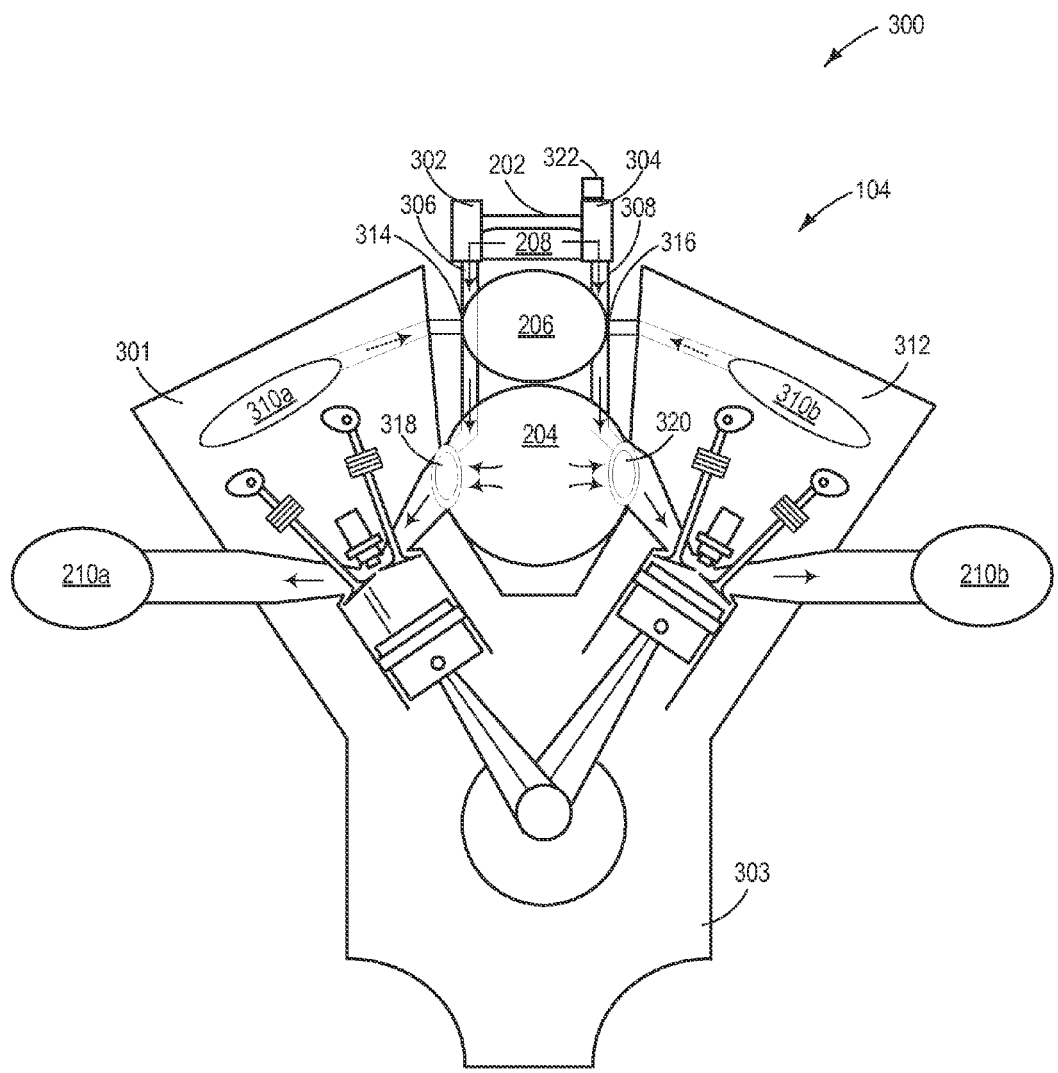

As mentioned above, in embodiments, the intake manifold includes three passages for the flow of three separate fluids, intake air, coolant, and gaseous fuel. FIG. 3 is a schematic cross-sectional view 300 of the intake manifold and two cylinder heads, including internal components, coupled to a cylinder block.

As explained above, the intake manifold 202 includes the first passage 204, second passage 206, and third passage 208. Each of the passages is a hollow passageway configured to flow a different fluid to or from the engine through the intake manifold. The first passage is an intake air passage configured to flow intake air, the second passage is a coolant passage configured to flow coolant (e.g., water, lubricating oil, air, or other suitable heat transfer fluid), and the third passage is a gas passage configure to flow gaseous fuel (e.g., natural gas). In one aspect, each of the three passages are not fluidly connected to one another, such that fluids in the passages do not co-mingle.

When the intake manifold is installed, the first passage is positioned in the intake manifold in a vertically-lowest position. That is, the second passage and third passage are each positioned above the first passage. The third passage is vertically above the second passage and the first passage, and the second passage is intermediate between the first passage and the third passage. Further, the intake manifold may include a central axis that runs from the top of the third passage to the bottom of the first passage, and each passage may be vertically aligned along the central axis. While the present disclosure illustrates the three passages with the relative positioning described above, other positions are within the scope of this disclosure. For example, in some embodiments the third passage that flows gaseous fuel may be located intermediate between the first, intake air passage and the second, coolant passage, or the third passage that flows gaseous fuel may be located beneath the first, intake air passage. In other embodiments, the second, coolant passage may be dispensed with, that is, the intake manifold includes only the passage for intake air and the passage for gaseous fuel, and not a passage for coolant. In still further embodiments, more than one coolant, gaseous, and/or intake air passage may be present in the intake manifold. For example, as described in more detail with respect to FIGS. 8A-8B, a second coolant line, configured to deliver cold coolant to the gas admission valves, may be positioned between the gaseous fuel passage and the coolant drainage passage.

The intake manifold is positioned between two cylinder banks. Each cylinder bank includes a plurality of separate cylinder heads coupled to a cylinder block. Thus, for each cylinder of the engine, a separate cylinder head is provided.

FIG. 3 illustrates two cylinder heads, cylinder head 301 and cylinder head 312. Each cylinder head houses the various engine components, including intake and exhaust valves, liquid fuel injector, etc. Further, cylinder head 301 is included as part of a first cylinder bank while cylinder head 312 is included as part of a second, different cylinder bank. Both cylinder heads are coupled to the same cylinder block 303.

Each cylinder head receives intake air for combusting in its cylinder via an intake runner fluidically coupling the first passage 204 of the intake manifold 202 to the cylinder head. For example, a first intake runner couples the first passage to one of the cylinder heads, while a second intake runner couples the first passage to the other cylinder head.

In order to supply gaseous fuel to the cylinders, a plurality of gas admission valves are mounted on the intake manifold. As shown, a first gas admission valve 302 and second gas admission valve 304 are shown mounted to the third passage 208. Each gas admission valve includes a solenoid or other actuator to open the valve. To regulate the amount (e.g., volume, flow rate, etc.) of gaseous fuel that flows from the third passage to a respective cylinder, the duration the valve is open may be adjusted.

The gaseous fuel is directed from the third passage to the cylinder heads through a plurality of gas runners. FIG. 3 illustrates two gas runners, first gas runner 306 and second gas runner 308. The first gas runner fluidically couples the first gas admission valve to a cylinder head. The second gas runner fluidically couples the second gas admission valve to a cylinder head. Each gas runner of FIG. 3 is a vertical runner that extends along the height of the intake manifold. Accordingly, the gas runners exit out of the third passage, pass outside or traverse through the second passage, and enter into the first passage. In the first passage, each gas runner is fluidically coupled to a respective cylinder head in order to supply the gaseous fuel to the cylinder head. As such, the intake manifold includes plural gas runners corresponding to the number of cylinders, where there is a single gas runner corresponding to each cylinder, in one example.

For each given cylinder head, gas runner, and gas admission valve, the gaseous fuel exits the gas runner and mixes with incoming intake air at a mixing region where the intake manifold is coupled to the cylinder head. Specifically, each cylinder head may be coupled to the first passage of the intake manifold at an intake air port, such as intake air port 320 (where the cylinder head is coupled to the intake manifold) and intake air port 318. An open passageway may be tooled into the intake manifold to provide a passage from the gas runner to the intake air port. At the mixing region, which may be the junction point where the intake air port and cylinder head join, the gaseous fuel is mixed with the intake air before the fuel-air mix is drawn into the cylinder head. Each intake air port may include an insert to aid in gaseous fuel circulation and air mixing. However, in some embodiments the intake manifold may be coupled to each cylinder head without the inclusion of the inserts.

The intake manifold includes further couplings to the cylinder heads. For example, the second passage is fluidically coupled to each cylinder head through a plurality of coolant ports, such as coolant port 314 and coolant port 316. Each coolant port may receive coolant from a respective cylinder head and direct the coolant to the second passage, where it is routed to the engine coolant system. For example, FIG. 3 shows that the second passage receives coolant from a first coolant jacket 310a and a second coolant jacket 310b, each housed in a respective cylinder head. Further still, each cylinder bank has a separate exhaust manifold (e.g., exhaust manifold 210a and exhaust manifold 210b).

In some embodiments, one or more temperature sensors 322 may be present on or near the gas admission valves. The one or more temperature sensors may detect a temperature value of one or more of the gas admission valves and send a signal output to the controller. The controller may use the signal to determine the temperature of the one or more gas admission valves.

Thus, FIG. 3 illustrates that in embodiments, the intake manifold is comprised of three passages integrated in a single manifold. Each passage may be cast out of a suitable material, such as steel, aluminum, and/or nickel. The intake manifold may be cast or otherwise formed as one integrated component, or one or more of the passages may be cast separately and coupled together. In one example, the first passage and second passage may be cast together, and the third passage may be cast separately and coupled (e.g., welded) to the second passage.

As shown, the gas admission valves partially protrude out from the intake manifold. That is, the gas admission valves are each sunk into the third passage such that a portion of each valve is external to the intake manifold and a portion of each valve is housed inside the intake manifold. To house the gas admission valves, the third passage may include one or more mounting flanges including one or more bores in which the gas admission valves are inserted. The first passage and second passage may each have a substantially circular cross-section, while the third passage may have an oblong or oval cross-section. However, other cross-sectional shapes are possible, such as rectangular. Further, each gas runner may be substantially vertical, or may be curved in places. Additionally, each gas runner may comprise a channel cast or machined in the intake manifold, although separate pipes or tubes are also possible.

The gas runners may traverse the second passage, as described above. As such, in some embodiments, the second passage may be constricted where the runners travel through the passage, constricting the flow of coolant through the second passage at the runners. However, in other embodiments, the runners may be positioned substantially outside of the second passage (e.g., housed within the outer wall of the second passage) such that coolant flow is not restricted. In some conditions, the coolant in the second passage may act to cool the gas runners and/or gas admission valves. However, because the coolant flowing through the second passage is exiting the engine, the coolant may be hot due to heat transfer from the engine, and may not substantially cool the gas admission valves. Because the gas admission valves are located proximate the exhaust manifolds, heat from the exhaust may transfer to the gas admission valves. In some examples, the solenoid of each valve may be sunk into the third passage, in order to protect the valves. Additionally, the flow of gas through the gas admission valves may act to cool the valves, further protecting the solenoids. However, such positioning may not be sufficient to cool the gas admission valves under all operating conditions. Further, in some examples the solenoids may be at least partially positioned above the intake manifold. Thus, as explained in more detail below with respect to FIGS. 4A-8B, a thermal management system may be included to provide air or liquid cooling to the gas admission valves.

Figure 4A:
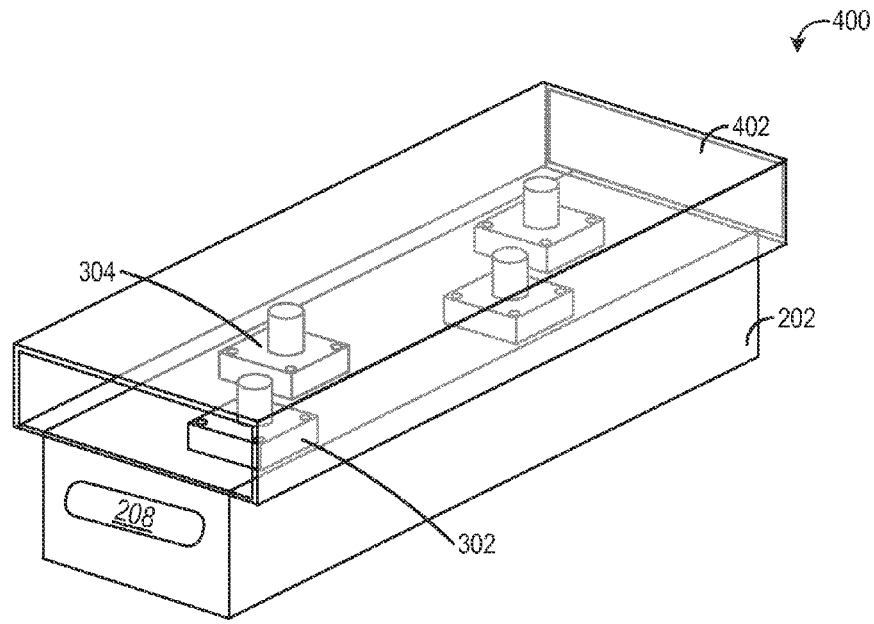
FIG. 4A shows a schematic diagram of a thermal management system according to a first embodiment of the invention.
Figure 4B:
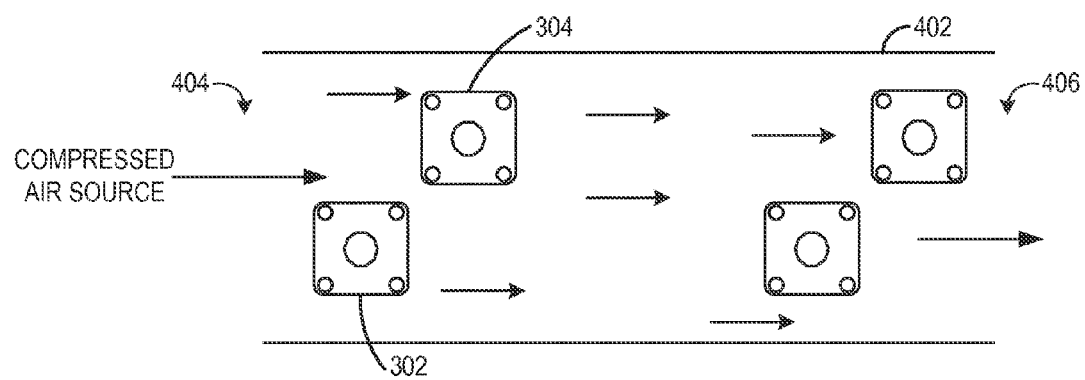
FIG. 4B is a thermal fluid flow diagram of the thermal management system of FIG. 4A.

FIGS. 4A and 4B schematically show a thermal management system 400 according to a first embodiment of the disclosure. The first thermal management system includes a container body 402 positioned on a top of the intake manifold of the engine (e.g., on top of intake manifold 202). The container body surrounds and/or covers the gas admission valves in order to create a flow path for thermal fluid to flow around the gas admission valves. The container body may be substantially box-shaped (e.g., rectangular) with a hollow inside where the gas admission valves are disposed. However, other container body shapes are possible, such as circular, oblong, square, etc. The container body may be directly mounted on the intake manifold in one example. In another example, the container body may be coupled to the intake manifold via a base or other intervening component. A bottom side of the container body (e.g., the side in face-sharing contact with the intake manifold) may have cut-outs or other openings to receive the gas admission valves. In other examples, the bottom of the container body may be essentially dispensed with, and the top of the intake manifold may act as the bottom of the container body. The container body may be comprised of a suitable material, such as metal, plastic, or other material. Further, while not shown in FIG. 4A, the container body may include one or more openings to accommodate the electrical connection between each gas admission valve and the controller.

The container body may extend along a length of the intake manifold, similar to the manner in which the gas admission valves extend along the intake manifold. The gas admission valves may be distributed along the length of the intake manifold, e.g., the gas admission valves may be distributed in one or two rows that extend in parallel with a longitudinal axis of the intake manifold. In some examples, the gas admission valves may be aligned in a single row. In other examples, the gas admission valves may be aligned in two rows. In the illustrated example, the gas admission valves are aligned in two rows, with each gas admission valve offset from a corresponding gas admission valve of the adjacent row. The gas admission valves may be evenly or unevenly staggered, or the gas admission valves may be evenly aligned and/or spaced along the length of the intake manifold. The container body may be substantially similar in length and width as the intake manifold in one example. In other examples, the container body may be longer, shorter, wider, and/or narrower than the intake manifold. The container body may have a suitable height, such that a flow path is present over the gas admission valves.

The container body includes a first open end 404 and a second open end 406. The container body is supplied with thermal fluid at the first open end, and the thermal fluid is released out of the container body at the second open end. Thus, the first open end may act as a thermal fluid ingress and the second open end may act as a thermal fluid egress. The thermal fluid may be pressurized air, sourced from a suitable location, such as downstream of a turbocharger compressor or from the locomotive compressed air system. When the pressurized air is introduced to the first open end, the air travels around and over the exposed portions of the gas admission valves, thus cooling the gas admission valves, as well as the top of the intake manifold. The air is then expelled from the container body to ambient (e.g., the atmosphere). As used herein, "pressurized air" may include air having a pressure greater than ambient pressure, or any suitable pressure that is high enough to force the air to travel through the container body at a speed that allows the air to effectively cool the gas admission valves.

Thus, the first thermal management system of FIGS. 4A-4B supplies pressurized air to a container body that surrounds and covers the gas admission valves. The container body includes at least three walls, a top wall and two side walls, and may include a bottom wall in some examples. The interior of the container body is open and the protruding (e.g., exposed) portions of the gas admission valves (e.g., the portions of the gas admission valves not sunk into the intake manifold) are disposed inside of the container body. While not illustrated in FIG. 4A, a tube or other internal structure may be present in the container body to direct the thermal fluid through the container body. In such examples, the container body itself may not define a thermal fluid flow path, but instead the internal tube may define the thermal fluid flow path.

The container body directs the pressurized air around and over the gas admission valves, thereby providing a general cooling of the gas admission valves and surrounding environment. Such a cooling mechanism may be inexpensive to install, but may not be able to adequately cool the gas admission valves under all operating conditions. Thus, a second thermal management system, illustrated in FIGS. 5A and 5B, actively cools the air introduced to the container body in order to increase the cooling capacity of the thermal management system.

Figure 5A:
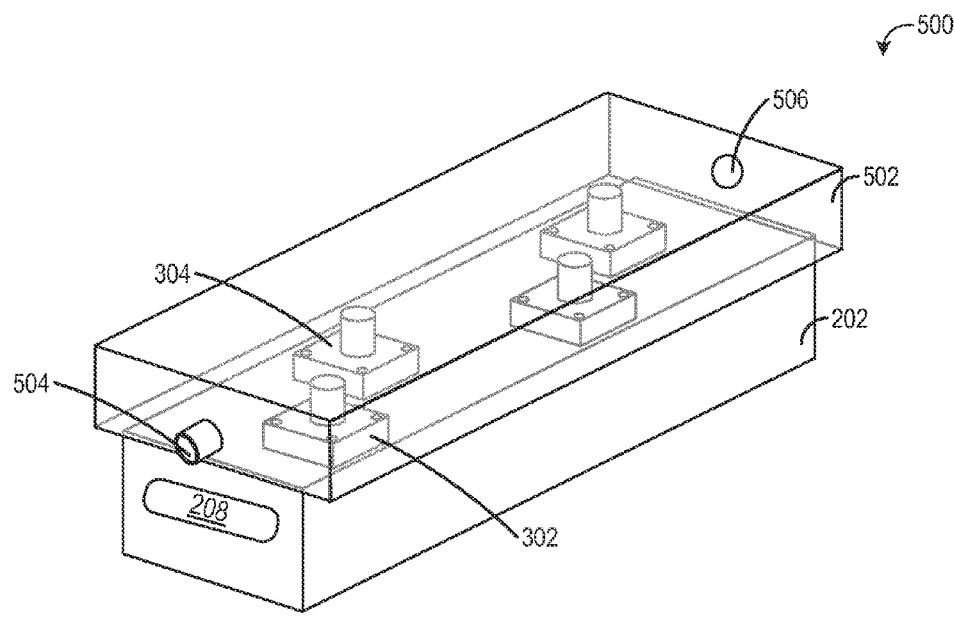
FIG. 5A shows a schematic diagram of a thermal management system according to a second embodiment of the invention.
Figure 5B:
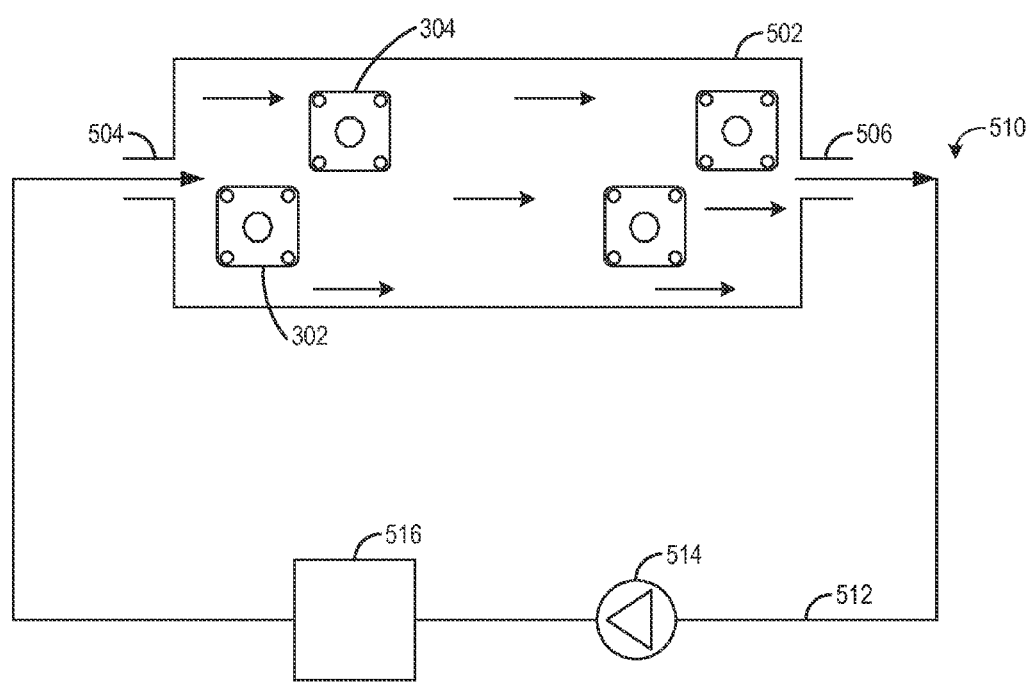
FIG. 5B is a thermal fluid flow diagram of the thermal management system of FIG. 5A.

FIGS. 5A and 5B illustrate a second thermal management system 500. The second thermal management system includes a container body 502. The container body of the second thermal management system is similar to the container body of the first thermal management system (container body 402), as it includes at least a top wall and two side walls and is directly or indirectly coupled to the intake manifold with the gas admission valves contained in an interior of the container body. However, the container body of the second thermal management system does not have two open ends. Instead, the container body of the second thermal management system is sealed from the ambient, other than an air inlet 504 and an air outlet 506. Each of the air inlet and air outlet are coupled to a thermal fluid circuit 510. The thermal fluid circuit includes a thermal fluid line 512 in fluid communication with the air outlet and the air inlet of the container body. The thermal fluid circuit also includes an air pump 514 and an air cooler 516. During operation, the air pump pumps pressurized air to the air cooler, where the air is cooled before being delivered to the air inlet of the container body. The cooled air is directed over and around the gas admission valves. The air, now warmed due to the heat transfer from the gas admission valves, exits the container body via the air outlet to the thermal fluid line. The air cooler may be a suitable cooler, such as an air-to-air heat exchanger, liquid-to-air heat exchanger, and/or refrigeration system. Further, the air cooler may be positioned upstream or downstream of the air pump.

Figure 6A:
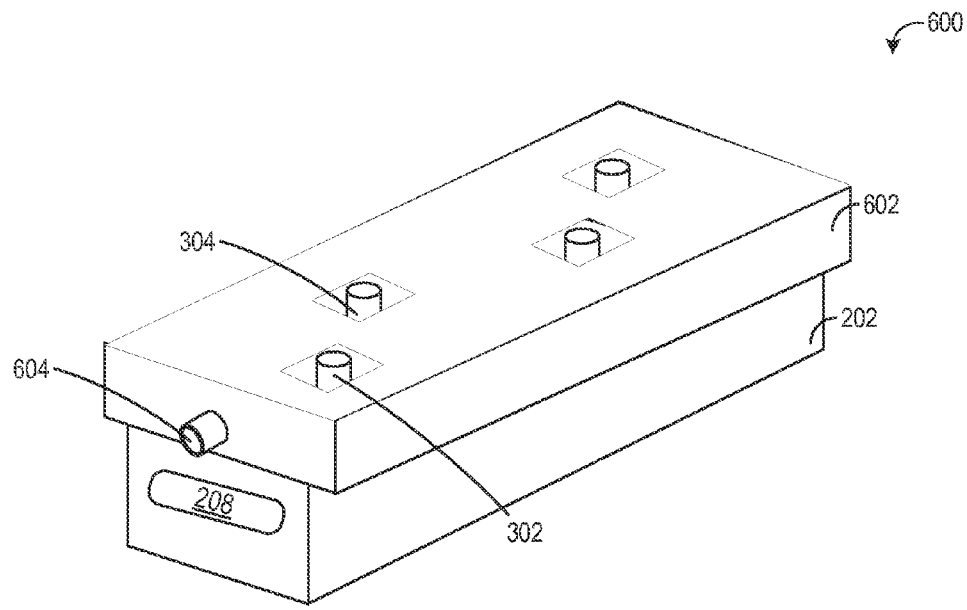
FIG. 6A shows a schematic diagram of a thermal management system according to a third embodiment of the invention.
Figure 6B:
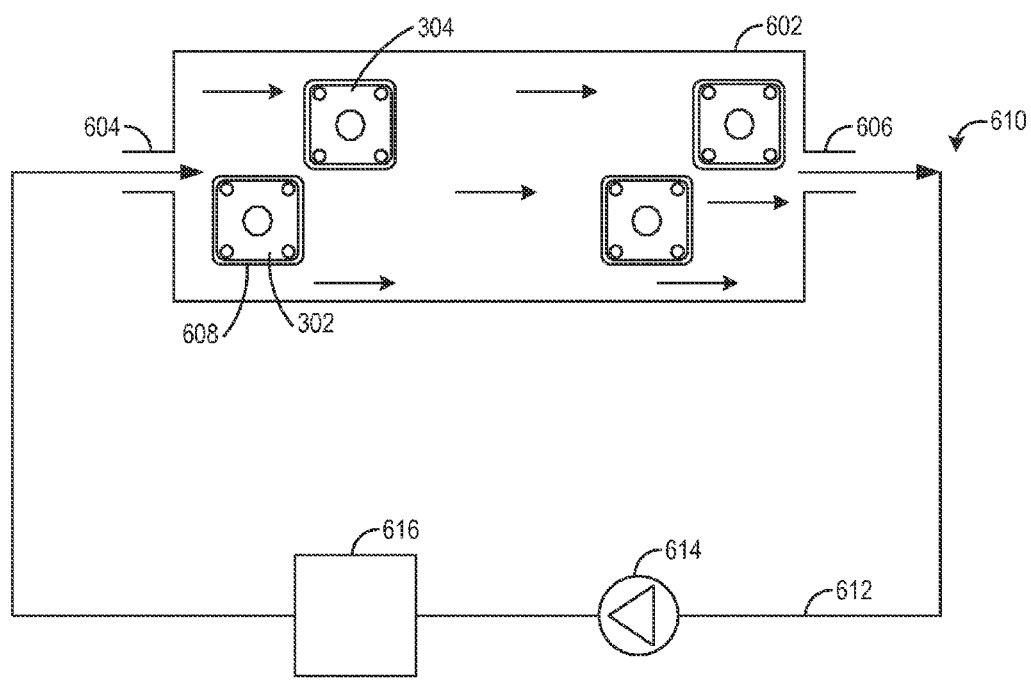
FIG. 6B is a thermal fluid flow diagram of the thermal management system of FIG. 6A.

FIGS. 6A and 6B illustrate a third thermal management system 600. The third thermal management system includes a container body 602. The container body of the third thermal management system is similar to the container body of the first thermal management system (container body 402) and the container body of the second thermal management system (container body 502), as it includes at least two side walls and a top wall and is directly or indirectly coupled to the intake manifold with the gas admission valves contained in an interior of the container body. The container body further includes thermal fluid inlet 604 and a thermal fluid outlet 606.

Each of the thermal fluid inlet and thermal fluid outlet are coupled to a liquid thermal fluid circuit 610. The liquid thermal fluid circuit includes a thermal fluid line 612 in fluid communication with the thermal fluid outlet and the thermal fluid inlet of the container body. The cooling circuit also includes a thermal fluid pump 614 and a thermal fluid cooler 616. During operation, the thermal fluid pump pumps pressurized liquid thermal fluid to the thermal fluid cooler, where the thermal fluid is cooled before being delivered to the thermal fluid inlet of the container body. However, in some examples, the thermal fluid pump may be located downstream of the thermal fluid cooler, rather than upstream as illustrated. As used herein, "pressurized liquid thermal fluid" may refer to liquid thermal fluid that is supplied to the container body via a pump, thereby forcing the liquid thermal fluid to travel through the cooling circuit and container body at a desired flow rate to achieve desired cooling of the gas admission valves. Further, the thermal fluid cooler may cool the liquid thermal fluid to a desired temperature, such as ambient temperature. In another example, the thermal fluid may be cooled to a temperature higher or lower than ambient temperature, depending on the type of cooler, temperature of the gas admission valves, etc. The cooled/cold thermal fluid is cool relative to the warmed/hot thermal fluid that is present after the thermal fluid passes over the gas admission valves. That is, in most operating circumstances, the thermal fluid entering the container body is cooler than the thermal fluid exiting the container body. The thermal fluid may be a suitable fluid, such as water, lubricating oil, or other heat-transfer fluid.

Once the pressurized liquid thermal fluid is delivered to the inlet of the container body, the cooled thermal fluid is directed around the gas admission valves. The thermal fluid, now warmed due to the heat transfer from the gas admission valves, exits the container body via the thermal fluid outlet to the thermal fluid line.

The thermal fluid cooler and pump may be a dedicated cooler and pump, and may include an air-to-liquid heat exchanger, in one example. That is, the cooler and pump may operate only to cool and pump thermal fluid to the container body, and not to provide thermal fluid to any other vehicle components. However, in other examples, the thermal fluid may be sourced from the general engine and/or vehicle coolant circuit, where the pump and cooler act to cool and pump coolant to and/or from the engine and/or other vehicle components. In a further example, the thermal fluid may be sourced from the main engine oil gallery.

In some examples, the thermal fluid that travels through the container body is prevented from directly contacting the gas admission valves via a plurality of shells 608. Each gas admission valve may be surrounded by a shell. An air gap may be present between the shell and the outer surface of the gas admission valve, or the shell may be in direct, face-sharing contact with the outer surface of the gas admission valve. In some examples, the shells may be a part of the container body (e.g., the container body may include cut-outs to accommodate the gas admission valves and the shells may be integrated with the container body at the cut-outs, with each shell defining a plurality of walls surrounding a respective gas admission valve). In other examples, the shells may be separate from the container body. The shells may be comprised of a suitable material, such as plastic, metal, or other material.

It is to be understood that the third thermal management system is not limited to the system described above, as other configurations are possible. For example, the container body may include a top wall to seal the thermal fluid passage around the gas admission valves from ambient. In another example, the shells around the gas admission valves may be dispensed with.

Thus, the above-described first, second, and third thermal management systems each include the introduction of pressurized air or liquid thermal fluid to a container body that is mounted on top of the intake manifold, via a first end of the container body. The container body defines a flow path around the plurality of gas admission valves such that the air or liquid thermal fluid is passed over and/or around the outer surfaces of the gas admission valves, transferring heat from the gas admission valves to the thermal fluid. The warmed thermal fluid is then expelled from a second end of the container body, to atmosphere or to a thermal fluid circuit. The container body may extend along a length of the intake manifold of the engine, parallel to the longitudinal axis of the intake manifold and extending in the same direction as the gas admission valves are distributed along the top of the intake manifold. Further, the container body may be disposed between two exhaust manifolds of the engine. Additionally, two or more container bodies may be connected in series along the length of the intake manifold, to cover all the gas admission valves of the engine.

The second and third thermal management systems include a closed circuit where air or liquid thermal fluid is pumped to the container body via a pump. In some examples, the pump may be a fixed displacement pump. In other examples, the pump may be a variable displacement pump configured to adjust a flow rate of the thermal fluid based on a signal from the controller. For example, if the temperature of one or more of the gas admission valves exceeds a high temperature threshold (as determined from feedback from a gas admission valve temperature sensor, such as sensor 322 of FIG. 3), the pump may be adjusted to increase the flow rate of thermal fluid and increase cooling of the gas admission valves. Other cooling adjustments are possible, such as increasing the amount of heat transferred from the thermal fluid via the cooler (by increasing the flow rate of air or coolant to the cooler, or decreasing a temperature of coolant at the cooler). In a still further example, if the gas admission valve temperature exceeds the high temperature threshold, engine power may be derated to reduce engine temperature and/or avoid possible degradation to the gas admission valves. In other examples, the gaseous fuel substitution ratio may be increased to increase a flow rate of gaseous fuel in order to cool the gas admission valves. Further still, a fan may be positioned proximate the intake manifold, and the fan may be activated, increase in fan speed, adjust a fan blade angle, or other parameter to increase cooling of the gas admission valves.

Figure 7A:
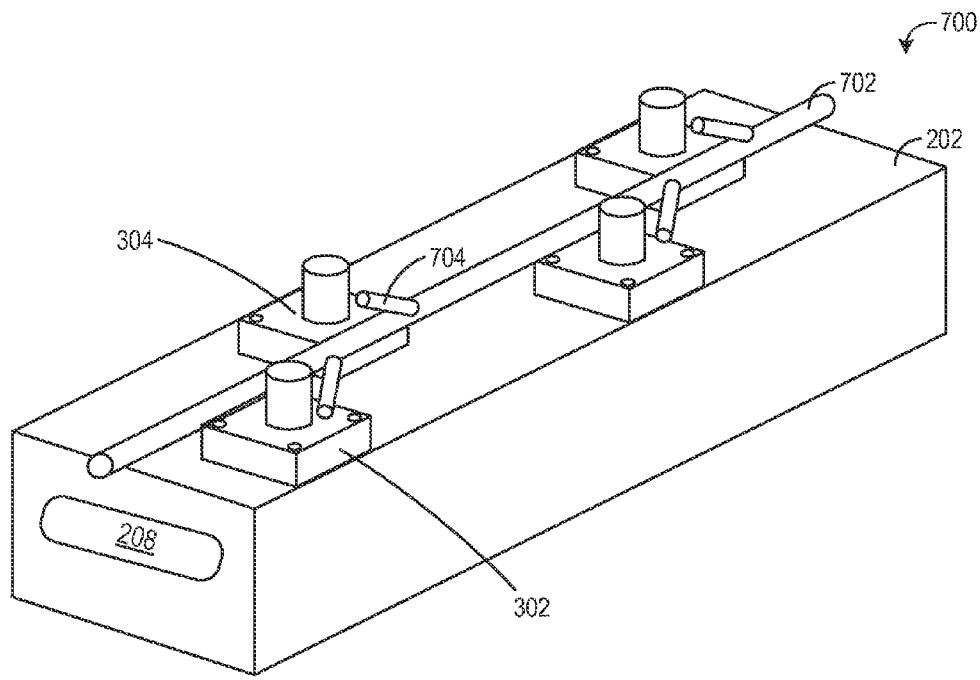
FIG. 7A shows a schematic diagram of a thermal management system according to a fourth embodiment of the invention.
Figure 7B:
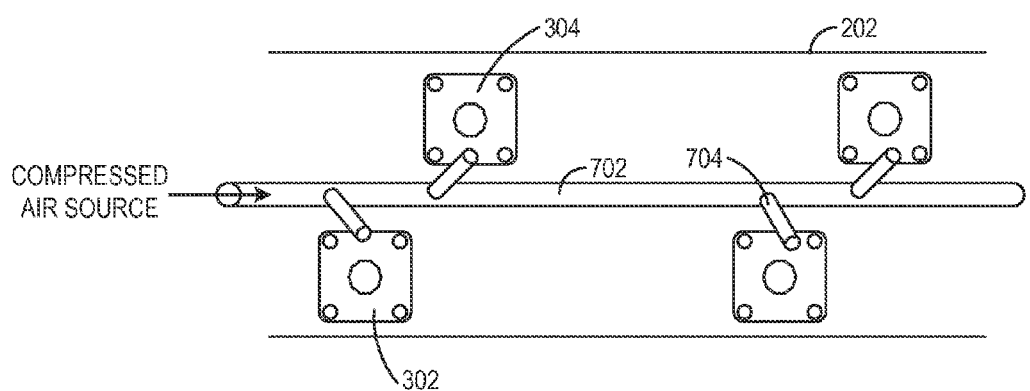
FIG. 7B is a thermal fluid flow diagram of the thermal management system of FIG. 7A.

FIGS. 7A and 7B illustrate a thermal management system 700 according to a fourth embodiment of the disclosure. Unlike the thermal management systems described above, the fourth thermal management system does not include a container body mounted to the intake manifold, but instead includes a pressurized air supply pipe 702 including a plurality of air jets 704. Each air jet is positioned to direct pressurized air to a respective gas admission valve, in order to cool the valve. The pressurized air supply pipe may be mounted to the top of the intake manifold, for example along a center of the intake manifold, between the gas admission valves (which may be offset from one another such that a gap large enough to accommodate the pressurized air supply pipe is present). The pressurized air may be supplied to the supply pipe from a suitable source, such as from a vehicle compressed air system or from downstream of a turbocharger compressor.

The above-described thermal management systems may all be relatively simple and inexpensive to install. Further, at least some of the thermal management systems described above may be retroactively installed in the vehicle, as they do not require modification of existing vehicle components. However, the thermal management systems described above may take up an excess amount of packaging space, and/or may not provide an adequate amount of cooling during high demand engine operation. Thus, as illustrated in FIGS. 8A and 8B, a fifth thermal management system 800 includes an integrated, targeted cooling configuration where liquid thermal fluid is provided directly to each gas admission valve, without taking up additional space.

The fifth thermal management system includes a plurality of integrated cooling compartments, where each cooling compartment is integrated within a respective gas admission valve. An example integrated cooling compartment 810 for a gas admission valve 809 is illustrated in FIGS. 8A and 8B (FIG. 8A illustrates a top perspective view of the integrated cooling compartment and gas admission valve, while FIG. 8B illustrates a side view of the integrated cooling compartment and gas admission valve). The integrated cooling compartment is integrated with the gas admission valve and provides a trough around the outer surface of the gas admission valve where thermal fluid flows from an inlet of the cooling compartment to an outlet of the cooling compartment. The cooling compartment includes an outer wall 812 that surrounds the gas admission valve. The outer wall is spaced apart from the gas admission valve to create a thermal fluid passage. The outer wall of the cooling compartment and the outer surface of the gas admission valve define a thermal fluid flow path through which liquid thermal fluid flows around the gas admission valve.

The cooling compartment includes an inlet port 814 in fluid communication with a cold liquid thermal fluid passage and an outlet port 816 in fluid communication with a hot liquid thermal fluid drain line. Thus, cold liquid is provided to the cooling compartment via the inlet port. The cold thermal fluid travels in the thermal fluid passage of the cooling compartment in order to contact the outer surface of the gas admission valve, where heat from the gas admission valve is transferred to the thermal fluid. The warmed thermal fluid is then drained out of the cooling compartment via the outlet port.

As explained previously, the gas admission valve is mounted on top of an intake manifold 802. The intake manifold 802 may be similar to the intake manifold 202 described previously, in that it includes a gaseous fuel passage 804 and hot thermal fluid drainage passage 808. The intake manifold illustrated in FIGS. 8A and 8B also includes a cold liquid thermal fluid passage 806. The cold liquid thermal fluid passage is positioned between the gaseous fuel passage and the hot liquid thermal fluid drain passage, however other configurations are possible. As illustrated in FIG. 8B, a cold thermal fluid inlet passage 820 fluidically couples the cold thermal fluid passage of the intake manifold to the inlet port of the integrated cooling compartment. The cold thermal fluid inlet passage may comprise a line positioned outside of the gaseous fuel passage and drilled into the intake manifold at the cold thermal fluid passage. A hot thermal fluid outlet passage 822 fluidically couples the hot thermal fluid drain passage of the intake manifold to the outlet port of the integrated cooling compartment. The hot thermal fluid outlet passage may comprise a line positioned outside of the gaseous fuel passage and cold thermal fluid passage and drilled into the intake manifold at the hot thermal fluid drain passage. In other examples, the cold thermal fluid outlet passage and hot thermal fluid outlet passage may include flexible or rigid ducts.

Thus, as shown in FIG. 8B, gaseous fuel from the gaseous fuel passage is admitted to the engine (e.g., to a cylinder of the engine) via the gas admission valve. Cold thermal fluid from the cold thermal fluid passage of the intake manifold enters the integrated cooling compartment via the cold thermal fluid inlet passage and inlet port and travels through the thermal fluid passage of the integrated cooling compartment. The warmed thermal fluid then exits the integrated cooling compartment via the outlet port to the hot thermal fluid outlet passage, and drains out of the intake manifold through the hot thermal fluid drain passage. The thermal fluid entering the cold thermal fluid passage of the intake manifold may be sourced from a suitable source, such as the main engine coolant line (e.g., from cooling system 150 of FIG. 1). Similarly, the hot thermal fluid may drain back into the general engine coolant system. In another example, the cold thermal fluid passage may be sourced from an engine lubricating oil passage, such as the main engine oil gallery, and the hot thermal fluid may drain back to the oil line, upstream of the oil cooler. To prevent leaks in the integrated cooling compartment, an O-ring may be present between the inlet port and the cold thermal fluid inlet passage, and an O-ring may be present between the outlet port and the hot thermal fluid outlet passage. Further, the integrated thermal fluid compartment may include a bottom wall, elevated above the top surface of the intake manifold, in which the inlet and outlet port are positioned. The bottom wall may be continuous with the outer wall of the cooling compartment. Additionally, the outer surface of the gas admission valve may comprise a casing in order to prevent contact between the thermal fluid in the integrated cooling compartment and the electronics of the gas admission valve.

The thermal management systems described above with respect to FIGS. 4A-8B provide thermal fluid to the gas admission valves in order to transfer heat away from the gas admission valves. However, in some embodiments, the gaseous fuel itself may be cooled prior to reaching the gas admission valves, to further lower the thermal load on the gas admission valves. In one example, upstream of the engine, the liquid fuel supply line may be routed adjacent to the gaseous fuel supply line, such that the two fuel supply lines are in contact with each other along at least a portion of the supply lines. In some circumstances, the flow of liquid fuel may transfer heat from the gaseous fuel. For example, during engine operating conditions where a relatively high flow rate of liquid fuel is present (e.g., during conditions where the substitution ratio is low or zero), the high flow rate of liquid fuel may cool the gaseous fuel sufficiently so that the gas admission valve cooling via one of the thermal management systems described above may be dispensed with. Then, during conditions of relatively low liquid fuel flow rate (e.g., during high substitution ratio conditions), when the low liquid fuel flow rate may not adequately cool the gaseous fuel, the active cooling of the gas admission valves via flow of thermal fluid through the thermal management system may be activated.

Accordingly, in some embodiments, the control system may include non-transitory instructions executable to flow liquid fuel through a first liquid fuel supply line and flow gaseous fuel through a second gaseous fuel supply line at respective flow rates that are based on engine operating conditions. For example, during high engine power demand, the gaseous to liquid fuel substation ratio may be relatively low (e.g., little or no gaseous fuel may be consumed by the engine). As a result, the liquid fuel flow rate may be relatively high. The liquid fuel supply line and the gaseous fuel supply line may be in contact with each other along at least portion of the gaseous and liquid fuel flow path, such that the high liquid fuel flow rate acts to cool the gaseous fuel. The control system may include further instructions executable to disable active gas admission valve cooling during conditions of high liquid fuel flow rates by deactivating a pump configured to pump a thermal fluid to the gas admission valves, for example. The instructions may be further executable to activate the active gas admission valve cooling (e.g., by activating a thermal fluid pump of a thermal management system described above) when liquid fuel flow rate drops below a threshold and/or when the substation ratio increases above a threshold where adequate gaseous fuel cooling may not be provided by the flow of liquid fuel. In some examples, rather than a threshold liquid fuel flow rate or substitution ratio, the gas admission valve cooling via the thermal management system may be activated based on a gas admission valve temperature.

Thus, according to the systems described in FIGS. 1-8B, in an embodiment a system comprises an engine having a plurality of cylinders configured to combust gaseous fuel; an intake manifold including a gaseous fuel passage for supplying the gaseous fuel to the plurality of cylinders of the engine, an intake passage for supplying intake air to the plurality of cylinders, a cold liquid thermal fluid passage, and a hot liquid thermal fluid drain passage; a plurality of gas admission valves mounted to the gaseous fuel passage for regulating admission of the gaseous fuel to the plurality of cylinders; and a plurality of integrated cooling compartments, each respective integrated cooling compartment of the plurality of integrated cooling compartments surrounding a respective gas admission valve of the plurality of gas admission valves. Each integrated cooling compartment comprises an inlet port in fluid communication with the cold liquid thermal fluid passage, an outlet port in fluid communication with the hot liquid thermal fluid drain passage, and a thermal fluid passage for directing thermal fluid received from the inlet port around the respective gas admission valve and to the outlet port, the thermal fluid passage defined by an outer wall of the integrated thermal fluid compartment and an outer surface of the respective gas admission valve.

Another embodiment of a system comprises an engine configured to combust gaseous fuel. The engine comprises an intake manifold including a gaseous fuel passage for supplying the gaseous fuel to a plurality of cylinders of the engine, and a plurality of gas admission valves mounted to the gaseous fuel passage for regulating admission of the gaseous fuel to the plurality of cylinders. The system further includes a thermal management system to direct thermal fluid to the plurality of gas admission valves. In examples, the intake manifold further comprises an engine thermal fluid passage and an intake air passage.

In an embodiment, the thermal management system comprises a container body coupled to the intake manifold, the plurality of gas admission valves disposed within the container body thereby to create a thermal fluid passage around the plurality of gas admission valves, the container body including a first end to receive the thermal fluid and a second end to expel the thermal fluid. In an example, the thermal fluid is pressurized air supplied to the container body at the first end from a pressurized air source, and the pressurized air is expelled to atmosphere at the second end, after traveling around the plurality of gas admission valves. The pressurized air source comprises one or more of compressed air from downstream of a turbocharger compressor, compressed air from an air compression system, or redirected from a blower via ducts.

In an example, the thermal fluid is pressurized air supplied to the container body at the first end via an air pump of a thermal fluid circuit, and the pressurized air is expelled to the thermal fluid circuit at the second end, after traveling around the plurality of gas admission valves. The thermal fluid circuit comprises an air cooler to cool the pressurized air received from the second end before supplying the cooled pressurized air to the first end.

In another example, the thermal fluid is pressurized liquid thermal fluid supplied to the container body at the first end via a thermal fluid pump of a thermal fluid circuit, the pressurized air is expelled to the thermal fluid circuit at the second end, after traveling around the plurality of gas admission valves, and the thermal fluid circuit comprises a liquid cooler to cool the pressurized liquid thermal fluid received from the second end before supplying the cooled pressurized liquid thermal fluid to the first end. The system may further comprise a plurality of shells, each respective shell of the plurality of shells surrounding a respective gas admission valve of the plurality of gas admission valves, and the container body may open to ambient at a top of the container body.

In an example, the thermal management system may comprise a pressurized air supply pipe and a plurality of air jets, each respective air jet of the plurality of air jets positioned to direct pressurized air from the pressurized air supply pipe to a respective gas admission valve of the plurality of gas admission valves.

In an example, the thermal management system comprises a plurality of integrated cooling compartments, each respective integrated cooling compartment of the plurality of integrated cooling compartments surrounding a respective gas admission valve of the plurality of gas admission valves. The intake manifold may further comprise a hot liquid passage and a cold liquid passage. Each integrated cooling compartment comprises an inlet port in fluid communication with the cold liquid passage and an outlet port in fluid communication with the hot liquid passage, and a thermal fluid passage configured to receive cold liquid thermal fluid via the inlet port and expel hot liquid thermal fluid via the outlet port. The thermal fluid passage of each integrated cooling compartment is defined by an outer wall of the integrated cooling compartment and an outer surface of the respective gas admission valve. In other examples, the thermal fluid passage of each integrated cooling compartment is defined by an outer wall of the integrated cooling compartment and an inner wall of the integrated cooling compartment, where the inner wall of the integrated cooling compartment prevents direct contact between the thermal fluid and the gas admission valve. The inner wall may substantially surround the gas admission valve and be in face-sharing contact with the gas admission valve. In an example, the thermal fluid comprises engine lubricating oil supplied from a main engine oil gallery.

Another embodiment relates to a system comprising an engine configured to combust gaseous fuel. The engine comprises an intake manifold including a gaseous fuel passage for supplying the gaseous fuel to a plurality of cylinders of the engine, a plurality of gas admission valves mounted to the gaseous fuel passage for regulating admission of the gaseous fuel to the plurality of cylinders, each gas admission valve of the plurality of gas admission valves protruding out from a top of the intake manifold, the plurality of gas admission valves distributed along a length of the intake manifold, and an exhaust manifold extending in parallel along a side of the intake manifold. The system includes a thermal management system to direct thermal fluid to the plurality of gas admission valves.

In an example, the thermal fluid comprises pressurized air received from one or more of downstream of a turbocharger compressor, a compressed air system, or an air thermal fluid circuit, the air thermal fluid circuit including an air pump and an air cooler. In another example, the system further comprises an air pump or air compressor and an air cooler, and the thermal management system comprises a container body including a thermal fluid ingress and coupled to a top of the intake manifold, the at least one gas admission valve disposed within the container body thereby to define a thermal fluid passage around the plurality of gas admission valves In an example, the thermal fluid comprises liquid thermal fluid received from a liquid thermal fluid circuit, the liquid thermal fluid circuit including a thermal fluid pump and cooler. The liquid thermal fluid may be supplied to the liquid thermal fluid circuit from an engine coolant line.

The thermal management system may comprise a container body coupled to a top of the intake manifold, the plurality of gas admission valves disposed within the container body thereby to create a thermal fluid passage around the plurality of gas admission valves. The exhaust manifold may be a first exhaust manifold that extends in parallel along a first side of the intake manifold, and the engine may further comprise a second exhaust manifold extending in parallel along a second side of the intake manifold, the container body disposed between the first and second exhaust manifolds.

The system may further comprise a controller and a temperature sensor configured to send a temperature signal to the controller. The controller may be configured to determine a temperature of the at least one gas admission valve based on the temperature signal and adjust a flow rate of the thermal fluid by adjusting an output of the pump responsive to the temperature of the at least one gas admission valve exceeding a temperature threshold.

Another embodiment relates to a method for cooling at least one gas admission valve. The method includes flowing liquid fuel at a first flow rate through a liquid fuel supply line and flowing gaseous fuel at a second flow rate through a gaseous fuel supply line, where the along at least a portion of the liquid fuel supply line, the gaseous fuel supply line is in direct contact with the liquid fuel supply line. The method further includes, during a first condition, transferring heat from the gaseous fuel to the liquid fuel at the at least a portion of the liquid fuel supply line, via the flow of the liquid fuel, and deactivating a gas admission valve thermal management system configured to actively cool the at least one gas admission valve via flow of a thermal fluid. The method also includes, during a second condition, activating the gas admission valve thermal management system. In one example, the first condition includes the first flow rate being higher than the second flow rate and the second condition includes the second flow rate being higher than the first flow rate. In another example, the first condition includes the first flow rate being above a threshold rate and the second condition includes the first flow rate being below the threshold rate.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   an intake manifold including a gaseous fuel line for supplying gaseous fuel to a plurality of cylinders of an engine configured to combust the gaseous fuel, the intake manifold further including an intake air passage for supplying intake air, each cylinder of the plurality of cylinders receiving the intake air via a respective intake runner, each intake runner coupled to the intake manifold via a respective intake air port;
   one or more gas admission valves coupled to the gaseous fuel line for regulating admission of the gaseous fuel to the plurality of cylinders; and
   a thermal management system configured to direct thermal fluid to the one or more gas admission valves.

2. The system of claim 1, wherein the thermal management system comprises a container body coupled to the intake manifold, at least one of the one or more gas admission valves at least partially disposed within the container body and the container body defining at least a portion of a thermal fluid flow path proximate to the at least one of the one or more gas admission valves, and the container body includes a first end configured for thermal fluid ingress and a second end configured for thermal fluid egress.

3. The system of claim 2, further comprising a pressurized air source, and the thermal fluid comprises pressurized air supplied from the pressurized air source to the container body at the ingress, and the pressurized air is expelled to atmosphere at the second end, after thermal transfer with the at least one of the one or more gas admission valves.

4. The system of claim 3, wherein the pressurized air source comprises one or more of compressed air from downstream of a turbocharger compressor or compressed air from an air compression system.

5. The system of claim 2, wherein the thermal fluid is pressurized air supplied to the container body at the first end via an air pump of a thermal fluid circuit, wherein the pressurized air is expelled to the thermal fluid circuit at the second end, after traveling around the at least one of the one or more gas admission valves, and wherein the thermal fluid circuit comprises an air cooler to cool the pressurized air received from the second end before supplying the cooled pressurized air to the first end.

6. The system of claim 2, wherein the thermal fluid is pressurized liquid supplied to the container body at the first end via a thermal fluid pump of a thermal fluid circuit, wherein the pressurized liquid is expelled to the thermal fluid circuit at the second end, after traveling around the at least one of the one or more gas admission valves, and wherein the thermal fluid circuit comprises a liquid cooler to cool the pressurized liquid received from the second end before supplying the cooled pressurized liquid to the first end.

7. The system of claim 6, wherein the container body further comprises a shell surrounding the at least one of the one or more gas admission valves.

8. The system of claim 1, wherein the thermal management system comprises a pressurized air supply pipe and a plurality of air jets, each respective air jet of the plurality of air jets positioned to direct pressurized air from the pressurized air supply pipe to a respective gas admission valve of the one or more gas admission valves.

9. The system of claim 1, wherein the thermal management system defines one or more integrated cooling compartments, each respective integrated cooling compartment surrounding a respective one of the one or more gas admission valves, and further comprising at least one cylinder head, each cylinder head including at least one intake valve and at least one exhaust valve.

10. The system of claim 9, wherein the intake manifold defines a hot liquid passage to direct hot thermal fluid out of the intake manifold and a cold liquid passage to direct cold thermal fluid into the intake manifold.

11. The system of claim 10, wherein each of the one or more integrated cooling compartments comprises a respective inlet port in fluid communication with the cold liquid passage and a respective outlet port in fluid communication with the hot liquid passage, and a respective thermal fluid flow path configured to receive cold liquid thermal fluid via the inlet port and expel hot liquid thermal fluid via the outlet port.

12. The system of claim 1, wherein the thermal fluid comprises engine lubricating oil supplied from an engine oil gallery.

13. A system, comprising:
an intake manifold including a gaseous fuel line for supplying gaseous fuel to a plurality of cylinders of an engine configured to combust the gaseous fuel;
one or more gas admission valves coupled to the gaseous fuel line for regulating admission of the gaseous fuel to the plurality of cylinders; and
a thermal management system configured to direct thermal fluid to the one or more gas admission valves, wherein the thermal management system defines one or more integrated cooling compartments, each respective integrated cooling compartment surrounding a respective one of the one or more gas admission valves, wherein the intake manifold defines a hot liquid passage to direct hot thermal fluid out of the intake manifold and a cold liquid passage to direct cold thermal fluid into the intake manifold, wherein each of the one or more integrated cooling compartments comprises a respective inlet port in fluid communication with the cold liquid passage and a respective outlet port in fluid communication with the hot liquid passage, and a respective thermal fluid flow path configured to receive cold liquid thermal fluid via the inlet port and expel hot liquid thermal fluid via the outlet port, and wherein a thermal fluid passage of each integrated cooling compartment is defined by an outer wall of the integrated cooling compartment and an outer surface of the respective gas admission valve.

14. A system, comprising:
an engine configured to combust gaseous fuel, the engine comprising:
an intake manifold defining a gaseous fuel passage way for supplying the gaseous fuel to a plurality of cylinders of the engine,
one or more gas admission valves mounted to the gaseous fuel passage way for regulating admission of the gaseous fuel to the plurality of cylinders, each of the one or more gas admission valves extending outward from the intake manifold, the one or more gas admission valves distributed along a length of the intake manifold, and
an exhaust manifold extending in parallel along a side of the intake manifold;
a thermal management system configured to direct thermal fluid to the one or more gas admission valves; and
one or more integrated cooling compartments, wherein an outer wall of the cooling compartment and an outer surface of the one or more gas admission valves define a thermal fluid flow path through which thermal fluid flows around the one or more gas admission valves.

15. The system of claim 14, wherein the cooling compartment includes an inlet port in fluid communication with a cold liquid thermal fluid passage and an outlet port in fluid communication with a hot liquid thermal fluid drain passage, wherein the cold liquid thermal fluid passage is positioned between the gaseous fuel passage way and the hot liquid thermal fluid drain passage.

16. The system of claim 15, wherein the cold liquid thermal fluid passage comprises a line positioned outside of the gaseous fuel passage way, wherein the hot liquid thermal fluid drain passage comprises a line positioned outside of the gaseous fuel passage way and cold liquid thermal fluid passage.

17. The system of claim 15, further comprising a controller and a temperature sensor configured to send a temperature signal to the controller, and wherein the controller is configured to determine a temperature of the one or more gas admission valves based on the temperature signal and adjust a flow rate of the thermal fluid responsive to the temperature of the one or more gas admission valves exceeding a temperature threshold.

18. The system of claim 15, wherein the cooling compartment further comprises a bottom wall in which the inlet and outlet ports are positioned, the bottom wall elevated above a top surface of the intake manifold.

19. A system, comprising:
an engine comprising a plurality of cylinders configured to combust gaseous fuel;
an intake manifold including a gaseous fuel passage for supplying the gaseous fuel to the plurality of cylinders of the engine, an intake passage for supplying intake air to the plurality of cylinders, a cold liquid thermal fluid passage, and a hot liquid thermal fluid drain passage;
a plurality of gas admission valves mounted to the gaseous fuel passage for regulating admission of the gaseous fuel to the plurality of cylinders; and
a plurality of integrated cooling compartments, each respective integrated cooling compartment of the plurality of integrated cooling compartments surrounding a respective gas admission valve of the plurality of gas admission valves and respectively comprising:
an inlet port in fluid communication with the cold liquid thermal fluid passage,
an outlet port in fluid communication with the hot liquid thermal fluid drain passage, and
a thermal fluid passage for directing thermal fluid received from the inlet port around the respective gas admission valve and to the outlet port, the thermal fluid passage defined by an outer wall of the integrated cooling compartment and an outer surface of the respective gas admission valve.

* * * * *